United States Patent [19]

Krüger

[11] Patent Number: 5,494,335
[45] Date of Patent: Feb. 27, 1996

[54] MOTOR VEHICLE WHEEL ARRANGEMENT

[75] Inventor: Helmut Krüger, Wolfsburg, Germany

[73] Assignee: Volkswagen AG, Wolfsburg, Germany

[21] Appl. No.: 258,698

[22] Filed: Jun. 13, 1994

[30] Foreign Application Priority Data

Jun. 11, 1993 [DE] Germany .......................... 43 19 357.9

[51] Int. Cl.⁶ ..................................... B60B 3/14
[52] U.S. Cl. ...................... 301/35.61; 301/35.63
[58] Field of Search ................... 301/9.1, 10.1, 301/11.1, 11.2, 17, 35.61, 35.62, 35.63

[56] References Cited

U.S. PATENT DOCUMENTS

| | | | |
|---|---|---|---|
| 1,609,878 | 12/1926 | Liddell | 301/35.61 X |
| 2,244,083 | 6/1941 | Richter | 301/35.61 X |
| 3,365,236 | 1/1968 | Snedeker | 301/35.61 |

FOREIGN PATENT DOCUMENTS

| | | |
|---|---|---|
| 2818512 | 11/1979 | Germany . |
| 3027191 | 2/1982 | Germany . |

*Primary Examiner*—Russell D. Stormer
*Attorney, Agent, or Firm*—Brumbaugh, Graves, Donohue & Raymond

[57] ABSTRACT

In the embodiment of a wheel arrangement described in the specification, the central portion of a wheel is in the form of a disk having an annular planar attachment zone surrounding a central hole for engagement with the substantially planar face of a hub. Bolt holes evenly distributed about the annular attachment zone of the disk receive stud bolts mounted in the hub so that the wheel disk and the hub are held in angularly fixed position with respect to each other. The hub has a centering offset projecting axially from its planar face which is located concentrically with a trunnion and has the shape of a circular annulus with a slightly conically tapered peripheral surface which engages the central hole of the wheel disk so as to center the wheel precisely with respect to the trunnion. The wheel disk is removably attached to the hub by a central nut screwed onto the trunnion which engages a substantially circular axially-resilient clamp disk having a central hole and a series of oblong holes located on a bolt circle concentric therewith. The oblong bolt holes receive the hub stud bolts and are engaged in annular groove-like undercuts formed therein so as to clamp the wheel disk firmly against the hub when the central nut is tightened.

4 Claims, 2 Drawing Sheets

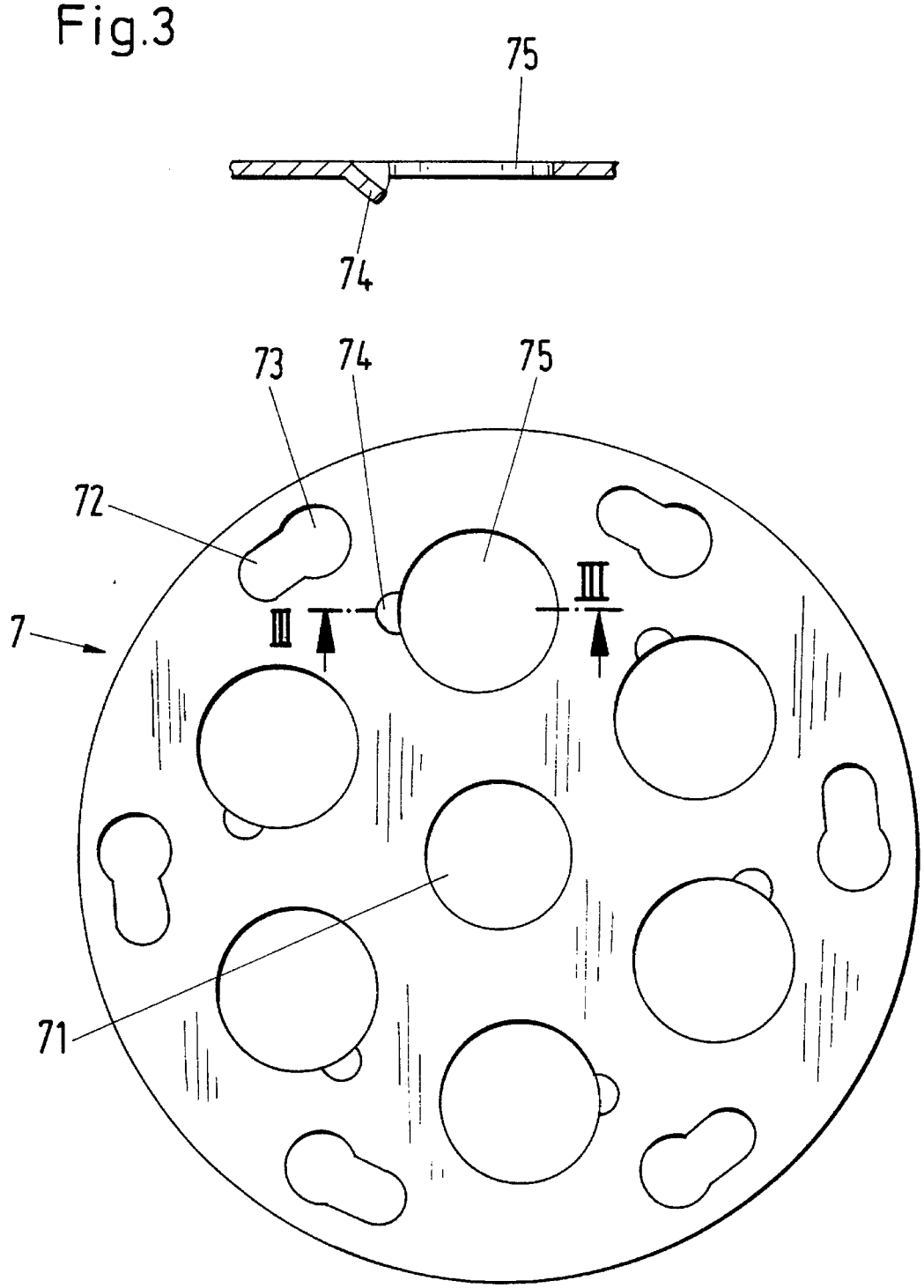

MOTOR VEHICLE WHEEL ARRANGEMENT

BACKGROUND OF THE INVENTION

This invention relates to motor vehicle wheel arrangements, especially for passenger motor vehicles, in which a central part supporting the wheel rim is removably mounted on the wheel hub by a central nut.

Conventional wheels for motor vehicles such as passenger motor vehicles include spoke wheels, cast wheels and so-called disk wheels. At present, disk wheels with disks pressed from sheet steel, also known as dished wheels, are preferred, especially for mass-production vehicles, because of their high dependability as well as their more favorable manufacturing cost compared to cast and spoke wheels.

In the disk wheel described in German Offenlegungsschrift No. 30 27 191, four or five, but in any case at least three, bolt holes are provided in the central portion of the disk for attachment of the disk wheel to the hub. The bolt holes are arranged in a circle and are equally spaced, the number and diameter of the holes depending upon the wheel load and other design considerations. Mounting of the disk to the hub is accomplished either by using fastening screws extending through the bolt holes into the hub with their heads in contact with the disk or by fastening nuts screwed onto studs fixedly mounted on the hub and extending through the disk holes so that the fastening screws or nuts clamp the wheel disk to the hub.

Usually, the wheel disk is depressed in a marginal zone around each of the bolt holes in the manner of a funnel to receive a correspondingly-shaped retaining screw head or nut. As a result, approximately truncated cone-like or partially spherical portions of the wheel disk, flaring toward the hub, are located between the screw and the hub, acting on the screw connection in the manner of a spring washer, i.e., undergoing a considerable elastic deformation when the wheel disk is mounted onto the hub.

Centering of the wheel disk on the hub is commonly effected in such disk wheels by the cooperation of the screw heads or nuts which are formed with spherical or conical bearing surfaces and the correspondingly spherical or conical conformation of the marginal zone around the bolt holes.

In order to remove and replace the wheels more quickly when changing tires, for example, it is known, especially in the case of sport and racing vehicles, to provide a wheel which is removably connected to its hub with only one screw connection, using a central nut screwed onto the trunnion.

German Offenlegungsschrift No. 28 18 512 discloses a motor vehicle wheel arrangement of this kind. In that arrangement, a cast wheel has a central portion supporting the wheel rim which includes a compact central bushing extending over a substantial portion of the width of the wheel and having a central bore of multiply-stepped diameter to be received on a correspondingly-stepped trunnion. A central nut screwed on the threaded free end of the trunnion has a portion facing the hub which extends into the central bore. The nut is approximately centrally positioned and has a radial shoulder beveled on the side facing the hub which cooperates with a mating externally-beveled annular zone of the central bushing to center the wheel on the trunnion and also provide an axial tension between the wheel and the hub. The trunnion and the wheel, or its central bushing, are held in angularly-fixed relation by engaged sinusoidally-shaped gear teeth in the central bore of the hub and in the portion of the trunnion facing the hub.

SUMMARY OF THE INVENTION

Accordingly, it is an object of the present invention to provide a disk-type motor vehicle wheel arrangement mounted by a central nut which overcomes the disadvantages of the prior art.

Another object of the invention is to provide a disk-type motor vehicle wheel arrangement mounted by a central nut which is easily installed, light in weight and inexpensive to manufacture.

These and other objects of the invention are attained by providing a wheel disk having a central hole by which it is mountable on a hub and having at least three bolt holes uniformly spaced in the angular direction around an annular fastening portion of the wheel disk. The wheel disk is clamped to a hub mounting surface by a clamp disk which has peripheral mounting holes, each having an opening large enough to receive the bolt heads and a smaller-width part to be received in an undercut portion of each bolt. A central nut is threaded on the hub trunnion to urge the clamp disk against the wheel disk.

BRIEF DESCRIPTION OF THE DRAWINGS

Further objects and advantages of the invention will be apparent from a reading of the following description in conjunction with the accompanying drawings, in which:

FIG. 2 is a plan view illustrating a representative embodiment of a clamp disk used in the wheel arrangement according to the invention; and FIG. 3 is a fragmentary sectional view of the disk shown in FIG. 2, taken along the line III—III and looking in the direction of the arrows.

DESCRIPTION OF PREFERRED EMBODIMENTS

Figure 1:
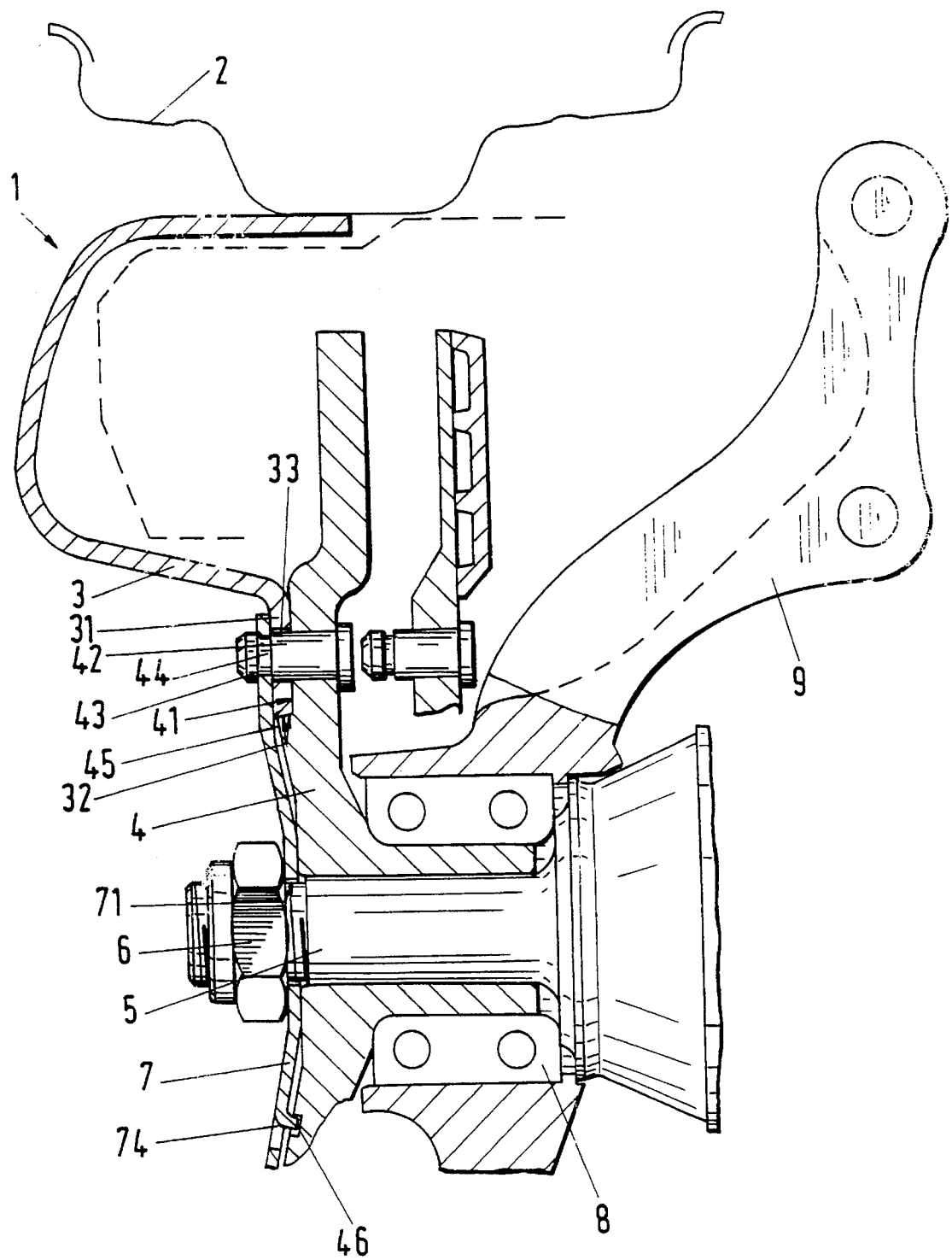
FIG. 1 is a fragmentary cross-sectional view illustrating a representative motor vehicle wheel arrangement according to the invention.

In the typical embodiment of the invention shown in FIG. 1, a motor vehicle wheel 1 in the form of a disk wheel for a passenger vehicle has a rim 2, shown in outline, and a wheel disk or dish 3 made, for example, of pressed sheet steel, supporting the rim for attachment to a hub 4 which is rotatably mounted by a rolling bearing 8 in a conventional swivel 9.

In order to removably attach the disk 3 to the hub 4, a single screw arrangement, consisting of a central nut 6 screwed onto a trunnion 5 carried by the hub 4 is provided. The nut 6 and trunnion 5 preferably are formed with a fine thread so that sufficiently high tightening torques can be manually applied by a wheel nut wrench.

The central nut 6 does not clamp the wheel disk 3 to the hub 4 directly, but does so through a substantially circular clamp disk 7 which engages the trunnion 5. The clamp disk 7, which has some resilience in the axial direction, is tightened firmly against the hub 4 by the central nut 6.

The wheel disk 3 has an annular planar fastening portion 31 surrounding a comparatively large central hole 32, of planar configuration and having at least three uniformly arranged bolt holes 33 for attachment to the hub 4. Compared to conventional disk wheels with a disk pressed from sheet steel, the motor vehicle wheel arrangement according to the invention thus has a very simple configuration in the region of its attachment to the hub.

The planar annular attachment region 31 of the wheel disk engages a substantially planar face 41 of the hub, and at least three projecting studs 42 affixed to the hub 4 which have the same cross-sectional size extend through the corresponding bolt holes 33. These projecting stud connections secure the disk 3 and hub 4 against relative rotation.

The hub 4 supporting the trunnion 5 includes a centering offset 45 in the shape of an annular projection extending toward the wheel disk 3 and positioned concentrically with respect to the trunnion 5 to receive the central hole 32 of the wheel disk. The offset 45 has a peripheral surface which is slightly tapered conically and engages the inner surface of the central hole 32 of the wheel disk 3, which has a matching taper. This centering offset in the hub ensures a precise centering of the wheel disk 3 and of the wheel 1 relative to the trunnion 5, and the tapered configuration of the centering offset as a sort of "advance" taper facilitates accurate fitting of the wheel disk 3 onto the hub 4.

The wheel disk 3, which is thus positioned not only by its central hole 32 but also on the studs 42 mounted in the hub 4 by its bolt holes 33, is then dependably and securely clamped to the hub by the clamp disk 7.

As shown in the embodiment illustrated in FIG. 2, the substantially circular, axially-resilient clamp disk 7 has a central hole 71 with approximately the same diameter as the trunnion diameter by which it is positioned on the trunnion 5. In addition, the disk 7 has a series of oblong holes 72, six in the embodiment shown in FIG. 2, by which the clamp disk 7 is also positioned on the free ends of the studs 42 which pass through the wheel disk 3.

As shown in FIG. 2, the oblong holes 72 have a configuration similar to conventional bayonet fastenings, that is, they have a passage opening 73 at one end substantially larger than the width of the remainder of the holes. The diameter of the passage opening 73 is slightly greater than the diameter of the heads 43 of the studs 42 so that, upon installation of the wheel, the clamp disk 7 can be quickly and securely mounted onto the trunnion 5 and thereafter rotated so as to engage the stud bolts 42.

The heads 43 of the stud bolts 42 are each provided with undercuts 44 in the form of annular grooves having a width which is slightly greater than the thickness of the clamp disk, as may be seen in FIG. 1. The normal width of the oblong holes 72 in the clamp disk is less than the diameter of the bolt heads 43, but slightly greater than that of the undercut 44, e.g., the diameters of the bolts at the annular grooves.

In attaching the wheel disk 3 to the hub 4, the wheel disk 3 is first mounted with its central hole 32 positioned on the centering offset 45 and its bolt holes 33 positioned on the stud bolts 42 of the hub 4 so that its planar annular fastening region 31 engages the face 41 of the hub. Then, the central hole 71 of the clamp disk 7 is placed on the trunnion 5 and the large-diameter openings 73 are slipped over the bolt heads 43 onto the stud bolts 42 and the disk is then rotated clockwise in the illustrated embodiment, so that it engages the undercuts 44 of the bolt heads 43 of the studs 42 with the slot-like narrower portions extending from the large-diameter opening 73 of the oblong holes 72 received in the annular undercut grooves of the studs.

The central nut 6 is then screwed onto the fine thread of the trunnion 5 so that the clamp disk 7, which initially has an unstressed position is bowed toward the hub in its central region by the central nut, and is then tightened axially against the hub 4. At the same time, a clamping action is produced between the stud bolts 42 and the clamp disk 7 with the oblong holes 72 engaging the annular groove-like undercuts 44 of the stud bolts and providing an accompanying corresponding axial force on the wheel disk 3 so that a secure and dependable connection for operation of the vehicle is obtained between the wheel disk 3 and the hub 4.

Although the connection formed by the central nut constitutes a very secure connection, it is advantageous to take additional measures to positively prevent any unintended reverse rotation of the clamp disk which would disengage the narrow oblong holes 72 from the undercut grooves 44 in the stud bolts.

Such assurance against reverse rotation may be simply achieved, as shown in the illustrated embodiment, by providing a series of resilient tongue-like tabs 74 in the clamp disk 7 which extend toward the hub 4 and are distributed around the clamp disk 7. These tabs 74 are received in matching recesses 46 in the face of the hub, as shown in FIG. 1, so that, when the central nut 6 is tightened, they will lock the disk against rotation.

In the representative embodiment of a clamp disk 7 shown in FIG. 2, the tongue-like tabs 74 are each located at the periphery of a series of additional holes 75 which are provided in the region of the disk between the central hole 71 and the oblong holes 72 for reasons of weight and convenience. The number and size of the additional holes 75 may, of course, also be designed so as to influence the axial resilience of the clamp disk 7.

Although the invention has been described herein with reference to specific embodiments, many modifications and variations therein will readily occur to those skilled in the art. Accordingly, all such variations and modifications are included within the intended scope of the invention.

I claim:

1. A motor vehicle wheel arrangement comprising:

a wheel disk having a central hole having a slightly tapered peripheral surface, a planar annular fastening portion surrounding the central hole, and at least three bolt holes uniformly distributed about the planar annular fastening portion, a hub supporting a trunnion and having a planar face portion, a circular annular centering offset projecting axially from the planar face portion and located concentrically with respect to the trunnion and having a slightly tapering conical outer peripheral surface, the offset engaging the slightly tapered peripheral surface of the central hole of the wheel disk, a substantially planar surface engaged by the planar face portion of the wheel disk, and at least three stud bolts having undercut heads projecting through the wheel disk bolt holes, a substantially circular axially-resilient clamp disk having a central hole receiving the hub trunnion and at least three oblong holes located on a bolt circle concentric to the central hole to receive the stud bolts of the hub and engage the undercut heads thereof, and a central nut threaded on the trunnion and urging the clamp disk against the hub.

2. A motor vehicle wheel arrangement according to claim 1 wherein the oblong holes of the clamp disk each have a width smaller than the diameter of the heads of the stud bolts but slightly greater than that of the undercut therein and a passage opening at one end of greater diameter than the bolt heads, enabling the bolt heads to be passed through the oblong holes during installation.

3. A motor vehicle wheel arrangement according to claim 1 wherein the undercuts of the bolt heads are shaped as encircling annular grooves having a width which is slightly greater than the thickness of the clamp disk.

4. A motor vehicle wheel arrangement according to claim 1 further comprising at least one resilient tongue-like tab extending outwardly from the clamp disk toward the hub and at least one corresponding recess in the hub arranged so that, when the central nut is tightened on the trunnion, the resilient tongue-like tab is locked into the hub recess to prevent relative rotation of the clamp disk and the hub.

* * * * *